United States Patent [19]

Tsai

[11] Patent Number: 4,974,078
[45] Date of Patent: Nov. 27, 1990

[54] DIGITAL COMPRESSION METHOD AND SYSTEM WITH IMPROVED CODING EFFICIENCY

[75] Inventor: Yusheng T. Tsai, Rochester, N.Y.

[73] Assignee: Eastman Kodak Company, Rochester, N.Y.

[21] Appl. No.: 435,653

[22] Filed: Nov. 13, 1989

[51] Int. Cl.[5] ..................... H04N 7/133; H04N 11/04
[52] U.S. Cl. ..................................... 358/133; 358/13; 358/44
[58] Field of Search ................... 358/13, 44, 133, 135, 358/136

[56] References Cited

U.S. PATENT DOCUMENTS

| | | | |
|---|---|---|---|
| 3,971,065 | 7/1976 | Bayer | 358/41 |
| 4,205,336 | 5/1980 | Nagumo | 358/43 |
| 4,302,775 | 11/1981 | Widergren et al. | 358/136 |
| 4,580,160 | 4/1986 | Ochi et al. | 358/48 |
| 4,591,900 | 5/1986 | Heeb et al. | 358/44 |
| 4,605,956 | 8/1986 | Cok | 358/44 |
| 4,613,895 | 9/1986 | Burkey et al. | 358/41 |
| 4,633,296 | 12/1986 | Cham et al. | 358/12 |
| 4,663,661 | 5/1987 | Weldy et al. | 358/44 |
| 4,714,955 | 12/1987 | Nishimura et al. | 358/48 |
| 4,736,243 | 4/1988 | Takanashi et al. | 358/47 |
| 4,774,562 | 9/1988 | Chen et al. | 358/13 |
| 4,774,574 | 9/1988 | Daly et al. | 358/133 |
| 4,774,587 | 9/1988 | Schmitt | 358/133 |
| 4,780,761 | 10/1988 | Daly et al. | 358/133 |
| 4,797,847 | 1/1989 | Duhamel | 364/725 |
| 4,837,724 | 6/1989 | Borgers et al. | 358/133 |
| 4,894,713 | 1/1990 | Delogne | 358/133 |
| 4,920,414 | 4/1990 | Remus | 358/133 |

OTHER PUBLICATIONS

ISO Adaptive Discrete Cosine Transform Coding Scheme For Still Image Telecommunication Services, Jan. 25, 1988.
Wen-Hsiung Chen and William K. Pratt, *IEEE Transactions On Communications*, vol. Com 32, No. 3, Mar. 1984, "Scene Adaptive Coder", pp. 225-232.
Norman B. Nill, *IEEE Transactions On Communications*, vol. Com 33, No. 5, Jun. 1985, "A Visual Model Weighted Cosine Transform for Image Compression and Quality Assessment", pp. 551-557.
Kenneth A. Parulski, *IEEE Transactions On Communications*, vol. ED-32, No. 8, Aug. 1985, "Color Filters and Processing Alternatives for One-Chip Cameras", pp. 1381-1389.

Primary Examiner—Howard W. Britton
Attorney, Agent, or Firm—Edward Dugas

[57] ABSTRACT

In a method for creating a scan sequence for a single chip color camera an analysis of typical images, captured through a color filter array, is performed to determine an optimal scan sequence for the particular array and/or the typical images. The images, after being digitally captured, are separated into red, green and a blue image databases and the color databases are processed separately. A Discrete Cosine Transform is performed on blocks of the image data and the average RMS values for the coefficients of the images are determined. The RMS values are sorted in descending order to produce a descending scan sequence that optimizes the performance of run length coding schemes. The scan sequence can be stored in a hardware, firmware or software lookup table as a list of block coordinates or indices and used by the camera system to convert two dimensional blocks of coefficients into one dimensional lists of coefficients suitable for run length coding. The block coefficients are used to convert the decoded coefficients into image blocks before presentation on a color CRT of before producing a color print. By incorporating the method into an image capture system an adaptive system which will optimize coding for different image environments and/or different color filter arrays suitable for the different environments is produced.

15 Claims, 6 Drawing Sheets

DIGITAL COMPRESSION METHOD AND SYSTEM WITH IMPROVED CODING EFFICIENCY

CROSS REFERENCE TO RELATED APPLICATIONS

This application is related to U.S. application 07/384,353, by Tsai, Rabbani and Parulski entitled A Compression Method And Apparatus For Single-Sensor Color Imaging Systems, assigned to Eastman Kodak Company and incorporated by reference herein.

BACKGROUND OF THE INVENTION

1. Field of the Invention

The present invention is directed to a digital image compression method and inverse compression method which improves compression coding efficiency, and more particularly, is directed to a compression method in which the image is captured through a color filter array requiring a coding sequence suitable for efficiently encoding the image captured through the array 2. Description of the Related Art Single chip color camera systems employ transform coding of the digital images or bandwidth compression prior to image transmission or storage to improve transmission or storage efficiency. In typical digital compression and transmission systems employing transform coding, the digital image is formatted into blocks and a spatial frequency transformation such as a Discrete Cosine Transform, DCT, or a visually weighted or Adaptive Discrete Cosine Transform (ADCT) is applied to each block to generate blocks of transform coefficients. The two-dimensional array of transform coefficients is conventionally encoded using a zig-zag scan sequence which scans along the diagonals of each block of coefficients. The combination of a color filter array with the zig-zag scanning pattern has resulted in a drastic reduction in the coding efficiency of the traditional Huffman and run length coding schemes used to code the transform coefficients and an improved scan sequence is needed.

SUMMARY OF THE INVENTION

It is an object of the present invention to improve image coding efficiency for single chip sensor cameras.

It is another object of the present invention to improve image coding efficiency for a single chip color camera when a color filter array is used.

It is a further object of the present invention to match the coding sequence for the image data to the color filter array pattern.

It is also an object of the present invention to provide a method of creating a scan sequence which improves coding efficiency for any camera using a color filter array.

It is a further object of the present invention to provide a camera system with an improved coding scan sequence.

The above objects can be accomplished by a system which performs an analysis on typical images, captured by a single chip color camera using a color filter array, to determine a robust scan sequence. The scan sequence can be designed for the typical images, the particular array or the typical images in combination with the particular array. During the analysis the images are separated into red, green and blue image databases. A Discrete Cosine Transform is performed on blocks of the image data for the color databases and the average RMS values or absolute values of the coefficients are determined. The values along with their corresponding block coordinates are arranged in descending order producing a scan sequence that optimizes the performance of run length coding schemes for the typical images and the array. The scan sequence is stored in a hardware, firmware or software lookup table and used by the camera to convert a two dimensional block of coefficients into a one dimensional list of coefficients suitable for run length coding. The inverse sequence is used to convert the decoded coefficients into image blocks before presentation on a color CRT or for producing a color print.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Conventional CCD imaging devices used in single chip cameras perform color interpolation before compression and produce DCT coefficients which generally decrease in amplitude as the distance from the DC component increases both horizontally and vertically producing generally linear diagonal equal amplitude contours. A conventional zig-zag scan sequence takes advantage of the generally equal amplitude diagonal contours to improve coding efficiency. However, in certain environments, such as when compression is performed directly on the input interpolated data, typical images produce DCT coefficients which may deviate from the generally equal amplitude diagonals assumed by the zig-zag scan sequence. In these environments, because the assumption is violated, encoding efficiency is reduced.

Such single chip cameras are also being provided with a color filter array such as described in U.S. Pat. No. 4,663,661, incorporated by reference herein, to obtain three color image data. The color filter array is created by depositing colored dyes on the charge coupled sensing elements of the camera sensor in a predetermined pattern such as the preferred Kodak Vertical 3G CFA pattern employed by Eastman Kodak Company. The conventional zig-zag scan sequence has conventionally been used to convert the two dimensional image coefficient data blocks for a single chip color camera, as mentioned in U.S. Pat. Nos. 4,780,761 and 4,774,574, incorporated by reference herein, into a one dimensional list of coefficients. The existence of a color filter array on the camera sensor has produced DCT coefficients that do not decrease in a regular pattern as the distance from the DC component increases. The addition of the color filter array has caused coefficient distortion, which, when the preferred color filter array is used, essentially produces a twisting and nonlinearization of the equal amplitude contours away from the diagonal producing an unsymmetric distribution. As a result, a conventional zig-zag scan produces a list of coefficients which changes dramatically in amplitude values from the beginning to the end. Such a variable amplitude list results in very inefficient run length coding compression. The present invention recognizes and solves this problem by providing a method of creating a coding sequence in which the coefficients are in descending order no matter what is the typical image environment or what dye pattern is included in the color filter array, thereby improving the compression efficiency of the compressed images.

Figure 1:
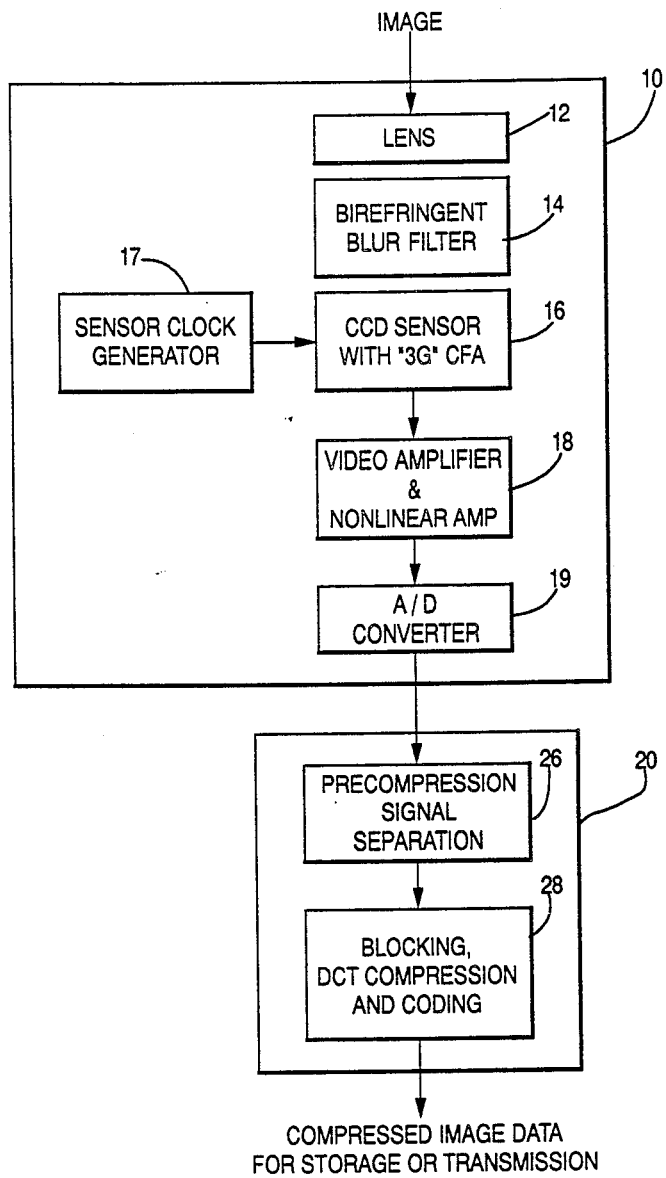
FIGS. 1 and 2 are a block diagram of a system which includes the present invention.
Figure 2:
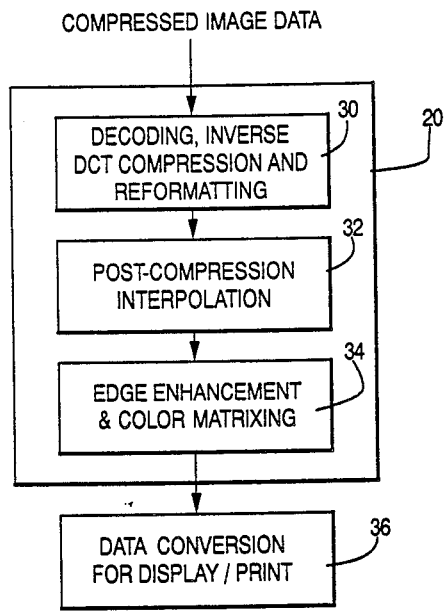

When a visible scene or image is scanned by a camera 10 in accordance with the preferred embodiment, as illustrated in FIG. 1, the image passes through a lens 12 and a filter 14 and impinges on a sensor 16 including the preferred color filter array. A sensor clock generator 17 produces a clock signal which scans the sensor 16 producing analog image values for each pixel. Conventional video and nonlinear amplifiers 18 in correct for nonlinearities in the sensor 16 and provide the corrected analog values to an analog-to-digital converter 19. The converter produces a digital value for each pixel of the sensor 16 and supplies the digital pixel values to a precompression and signal compression algorithm or unit 26 in a recording/playback unit 20. During the signal separation operation, the incoming pixel data is separated into red, green and blue data files corresponding to the dye arrangement in the pattern of the color filter array. The green pixels are converted into the L* domain and red/green and blue/green ratios are converted to the density domain. This process is described in more detail in U.S. application Ser. No. 07/384,353. The red, green and blue data files are separately blocked, transformed, compressed and coded by an algorithm or unit 28. The coding involves scanning the coefficients of each transformed block in a descending order and producing a one-dimensional array or list of coefficients which are then encoded. The compressed image is then suitable for storage or transmission over a communication circuit. To convert the compressed image into an image suitable for viewing or printing, as illustrated in FIG. 2, the compressed image is decoded, inverse transformed and reformatted by an appropriate algorithm or unit 30. Next, the image undergoes post compression interpolation 32, as described in U.S. application 07/384,353, followed by edge enhancement and color matrixing 34. At this point the system produces data suitable for printing or display 36.

Figure 3:
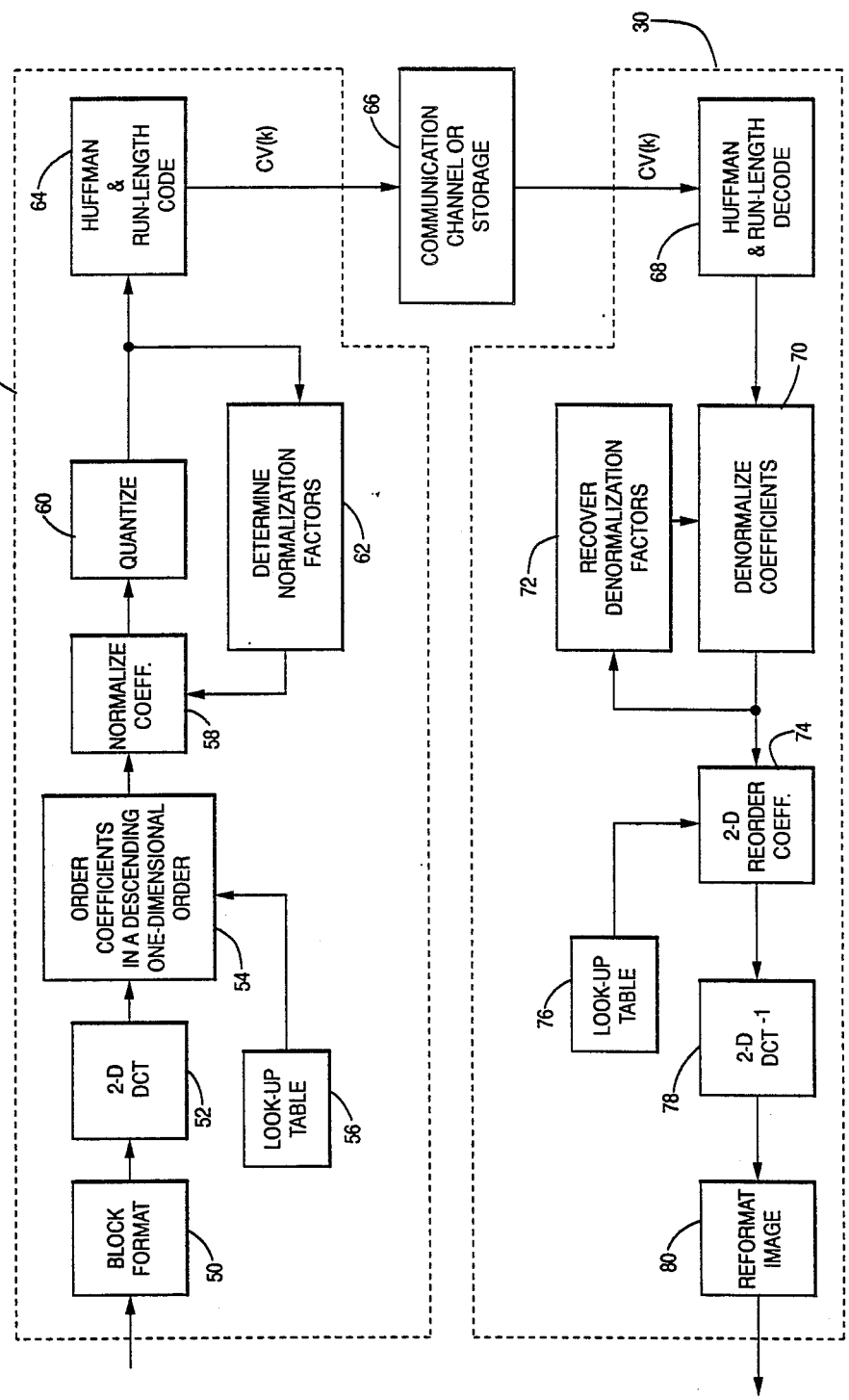
FIG. 3 illustrates the steps in blocks 28 and 30 of FIGS. 1 and 2 in more detail.

A more detailed description of the operations in blocks 28 and 30 is illustrated in FIG. 3. First, the digital color image databases are divided into blocks of 16 by 16 pixels or into blocks of 8 by 8 pixels if a microcomputer is used. A discrete cosine transform is performed 52 to produce corresponding transform coefficients. The transform coefficients in each block are ordered 54 into a one dimensional array or list in an order of decreasing or descending amplitude values. This ordering is performed by reading the coefficients in each block in a predetermined order as determined by a lookup table 56. The lookup table 56 will cause the block of transform coefficients to be sampled in an order which will produce a descending sequence of coefficient amplitudes. The details of how to produce this order will be discussed later. Next, the coefficients can be normalized, preferably in accordance with the sensitivity of the human visual system to spatial frequency as described in U.S. Pat. Nos. 4,780,761 and 4,774,574. The normalized coefficients are quantized 60 and the quantized coefficients are used to determine 62 normalization factors that are fed back. When the present invention is used with the preferred raw picture data processing method, described in U.S. application No. 07/384,353, perceptually weighted coefficient quantization should be modified or removed to improve efficiency. The quantized coefficients are encoded 64 preferably using Huffman and run length coding preferably as described in U.S. Pat. No. 4,302,775. The encoded coefficients are then stored in a storage unit 66 or transmitted over a communications channel. When the compressed and encoded image data is to be displayed or printed the system performs the reverse of the operation just described. The encoded values in storage are decoded 68 and denormalized 70. The denormalized coefficients are used to recover 72 denormalization factors. The one-dimensional list of denormalized coefficients are reordered 74 as a two dimensional array using an inverse lookup table 76 which places the coefficients back in their original positions. An inverse discrete cosine transform is then performed 78 followed by reformatting 80 the image data into image blocks. The details of this process are described in U.S. Pat. No. 4,780,761.

Figure 4:
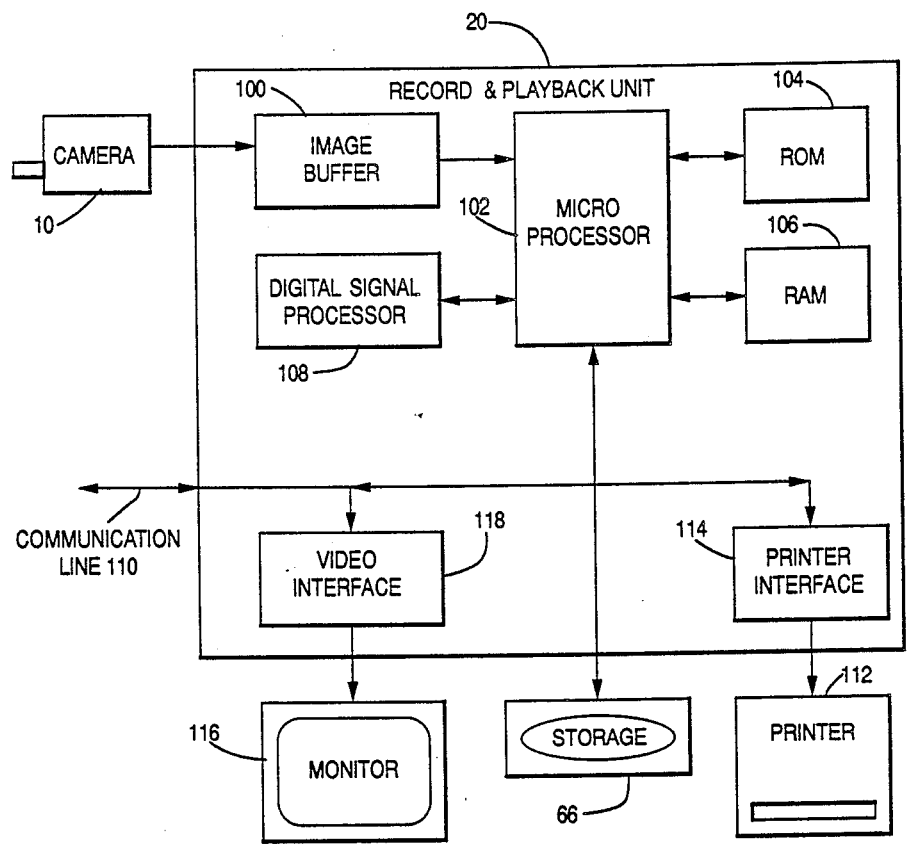
FIG. 4 illustrates a record/playback unit 20.

A record/playback unit 20 suitable for performing the steps described with respect to FIGS. 1–3 is illustrated in FIG. 4. This record/playback unit 20 includes an image buffer 100 which stores the image produced by the camera 10. The image stored in the buffer 100 is processed by a microprocessor 102 under the control of a program stored in read only memory 104 using the random access memory 106. The read only memory 104 contains a processing algorithm as discussed with respect to FIGS. 1–3 as well as the lookup tables previously mentioned. If high speed image processing is desired a specialized digital signal processor 108, such as the TMS 320 from Texas Instruments can also be employed in the unit 20. The microprocessor 102 can then provide the image data to a storage unit 109 such as magnetic or optical disc system or provide the compressed data over a communication line 110. Compressed data received over the communication line or retrieved from the storage 109 can be provided to a printer 112, such as a SATURN printer, through a convention printer interface 114. The data can also be provided to a conventional CRT monitor 116 through a conventional video interface 118.

FIGS. 1–3 assume that the scan sequence for converting each two dimensional block of transform coefficients into a one dimensional array suitable for encoding is included in a lookup table stored in a read only memory or in a storage unit such as a magnetic disc. In some situations it is appropriate to produce a scan sequence suitable for a particular color filter array or for a particular scene or series of images so that maximum coding efficiency is obtained. For example, if a color filter array recording system is part of a spacecraft, different color filter array sensors may be used by the spacecraft to scan different types of images. In this situation, the requirements for imaging the rings around a planet from a great distance are substantially different than imaging the surface of the planet when the spacecraft is close to the planet. In such situations, different color filter array sensors could be used for different applications. It may also be appropriate to scan the scene with a sensor that does not have a color filter array so that a maximum contrast image can be obtained. In a situation where the maximum coding efficiency is dictated because of storage limitations or transmission time limitations, optimization of compression with respect to a particular scene or typical images within a scene may be appropriate.

Figure 5:
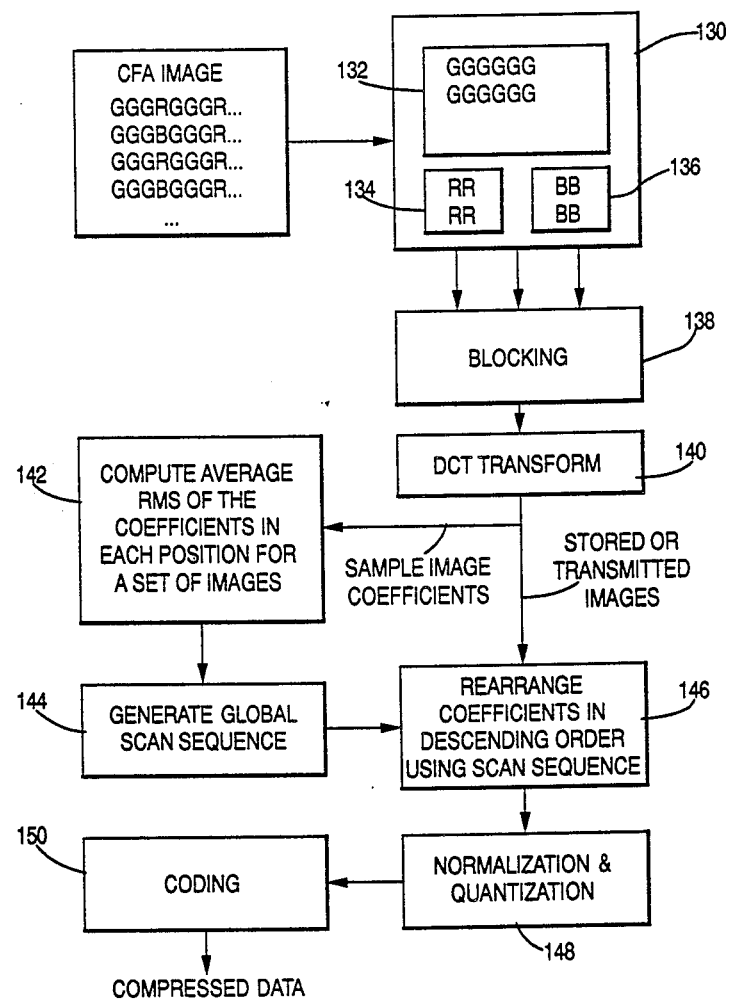
FIG. 5 depicts an adaptive system that optimizes coding efficiency for different image environments and different color filter arrays.

FIG. 5 illustrates an adaptive system suitable for different color filter arrays and different typical images. Even though this description will be provided with respect to color filter array image data processing, the process can also be applied to improving coding efficiency for typical image sets which are not obtained through a color filter array. In this system, it is preferred that at least eight sample images are processed to create a global scan sequence which is then used to process images to be transmitted. As previously discussed, the pixels of the images are divided 130 into color data files 132-136 corresponding to the dye pattern on the sensor. Each of the data files is blocked 138 and discrete cosine transformed 140. The sample image coefficients 141 are then used to compute the average RMS or absolute amplitude values of the coefficients for the images. The average RMS or absolute values are used to produce 144 a global scan sequence by sorting the coefficients in descending order while retaining the X and Y coordinates of each coefficient. When all the sample images have been processed to produce the global scan sequence, the images to be stored or transmitted can then be processed. The transform coefficients of the images 145 to be transmitted or stored are rearranged 146 in descending order using the scan sequence previously produced. The coefficients are then normalized and quantized 148 followed by coding of the coefficients as previously discussed. Each time the system illustrated in FIG. 5 encounters a new environment or uses a different color filter array, it will produce an optimized coding sequence which will reduce the transmission time or storage space required for the captured images. This is extremely important when high resolution images, which each require more than ten megabits for storage of the raw sensor data, are required.

Figure 7:
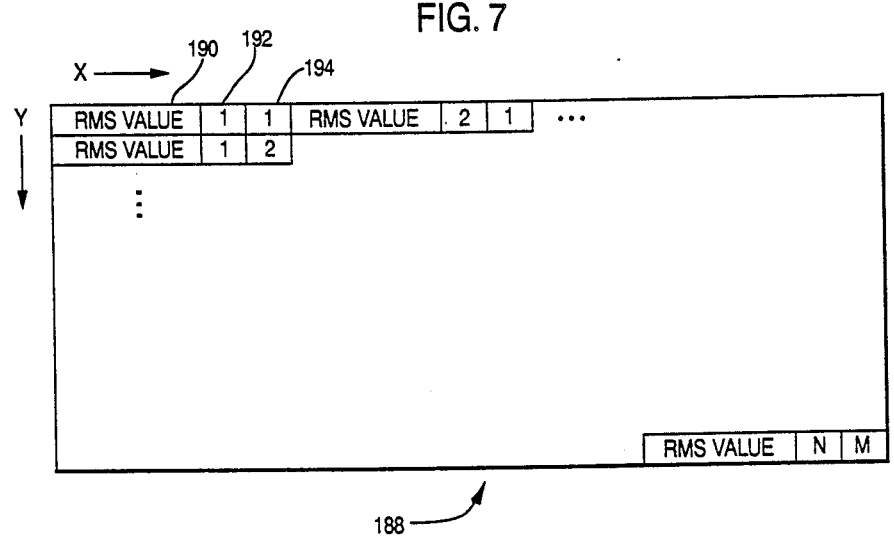
FIG. 7 illustrates an array that can be used for ordering coefficients.
Figure 6:
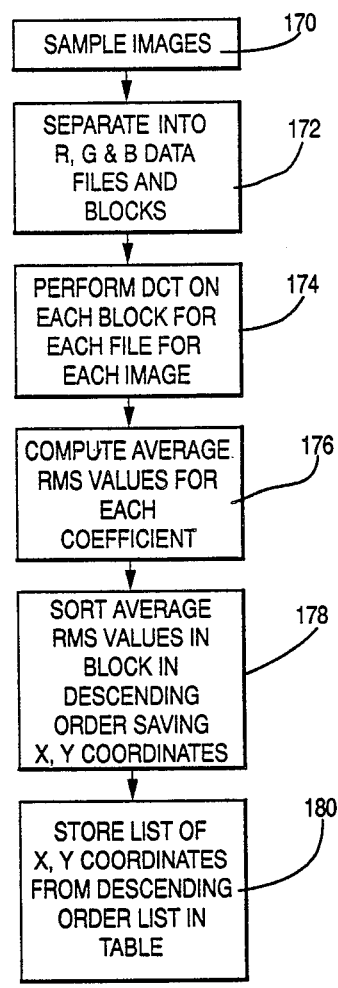
FIG. 6 is a flowchart of the method of the present invention for producing an optimal scan sequence.

In producing the scan sequence for a particular color filter array or image environment, the method of the present invention first samples 170 typical or reference images captured using the desired color filter array as illustrated in FIG. 6. As previously mentioned at least eight sample images should be processed. For a general purpose system capable of performing efficiently in practically any environment, a standard image set such as the 72 image set available from Kodak plus a completely white image should be scanned by the camera with the desired color filter array. Other sample image sets are available and suitable for the image sampling step 170, such as the ISO standard image set available from the International Standards Organization. Each image is processed to separate 172 the data into red, green and blue data files as previously discussed. The blocked color data files are processed separately in steps 174-180 to produce red, green and blue scan sequences. The blocked data files are transformed 174 using a conventional Discrete Cosine Transform algorithm as previously discussed. The system then computes 176 the average RMS values for coefficients within a block in accordance with equations 1 and 2 set forth below.

$$RMS(X, Y \text{ Image}) = \sqrt{\sum_{i=1}^{n/16} \sum_{j=1}^{m/16} Z_{ij}^2(X,Y)} \quad (1)$$

$$\text{Avg. } RMS(X, Y) = \Sigma RMS(X, Y, \text{ Image})/\text{No. Images} \quad (2)$$

where Z is the coefficient at each block coordinate (X, Y). Equations (1) and (2) cumulatively compute an RMS value for each coefficient in a block. For example in this method, if a sample image includes 64 blocks of 16 by 16 coefficients, first an RMS value for the image is computed by computing the RMS value for each coefficient of each block in the image. That is, the first coefficient in each of the 64 blocks is used to produce an RMS value for that coefficient representing this image. In this way an RMS value of corresponding coefficients in each block is determined to produce a block of RMS values which represents the entire image. Then an average RMS value is computed among the images by combining the corresponding coefficients of the representative block for each image. Rather than using the RMS values, the absolute values of the coefficients can be used. Once the block of average RMS coefficient values is produced, the coefficients are sorted 178 in descending order while saving the original X and Y coordinates of the RMS value in the average RMS value block. This can be accomplished by using an array such as illustrated in FIG. 7. The array includes an average RMS value field 190 for storing the RMS value and corresponding original coordinates fields 192 and 194 for storing coordinates corresponding to the original position of the RMS value in the average RMS values block. The array is then sorted in descending order on the RMS value field 190 to produce a list or one dimensional array of scan coordinates. For example, the first entry in the one-dimensional list could have the coordinates or indices (1,1) indicating that first scan sequence position is the (1,1) point in each block of an image to be compressed. The second entry in the list could have the coordinates (3,2) indicating that the next coefficient in the block being converted can be found in the third column and second row of the block. This list is then stored 180 in a table and used by the system to convert the two dimensional coefficient blocks into one dimensional arrays as previously discussed. The list of coordinates is also used to place the coefficients in a decoded one-dimensional array back to their original position when retrieved from storage. For example, when a one dimensional list is retrieved from storage, the second coefficient in the list would be placed in the (3,2) position in a two dimensional block.

The method of the present invention will apply to images captured using a sensor without a color filter array by eliminating step 172 and performing the DCT on only one file of blocks for each of the typical images. Only a single scan sequence will be produced rather than the three produced when a color filter array is used. This scan sequence will improve coding efficiency over the zig-zag scan when a color filter array is not used in an environment where the zig-zag scan is inefficient.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of producing a coefficient scan sequence for transform coefficients of an image to be encoded, said method comprising the steps of:
    (a) transforming reference images producing transform coefficients for the images;
    (b) determining average coefficients for the images;
    (c) ordering the average coefficients in descending order; and
    (d) storing the order of the average coefficients as the scan sequence.

2. A method as recited in claim 1, wherein the reference images are captured through a color filter array.

3. A method as recited in claim 1, wherein step (b) comprises:
    (b1) determining RMS values of the coefficients for each image; and
    (b2) averaging corresponding RMS value coefficients of the images.

4. A method as recited in claim 1, wherein step (b) comprises:
    (b1) determining absolute values of the coefficients for each image; and
    (b2) averaging corresponding absolute value coefficients of the images.

5. A method as recited in claim 1, wherein the images are separated into color image data files prior to transforming.

6. A method of producing a coefficient scan sequence for transform coefficients of an image to be encoded, said method comprising the steps of:
    (a) capturing reference images through a color filter array;
    (b) transforming the reference images producing transform coefficients for the images, comprising:
    (b1) separating the images into color image data files; and
    (b2) performing a two dimensional spatial frequency block transformation on the data files;
    (c) determining average coefficients for the images, comprising:
    (c1) determining RMS coefficient values for blocks of each image; and
    (c2) averaging corresponding RMS value coefficients of the images producing a block of average RMS value coefficients with corresponding block position coordinates;
    (d) sorting the average RMS value coefficients in descending order while carrying the block position coordinates producing a list of coordinates; and
    (e) storing the list of coordinates as the scan sequence.

7. An image compression system using a color filter array, comprising:
    transform means for performing a transformation of an image producing transform coefficients;
    coefficient ordering means for ordering the coefficients in dependence upon the color filter array; and
    encoding means for encoding the ordered coefficients.

8. A system as recited in claim 7, further comprising:
    analysis means for analyzing reference images through the color filter array and producing a coefficient scan sequence for ordering the coefficients in descending order.

9. A system as recited in claim 7, further comprising:
    playback means for decoding the ordered coefficients, reordering the decoded coefficients and inverse transforming the reordered coefficients.

10. An image compression system, comprising:
    transform means for performing a transformation on an image producing transform coefficients;
    coefficient ordering means for ordering the coefficients in dependence upon analysis of a reference image set; and
    encoding means for encoding the ordered coefficients.

11. A system as recited in claim 10, further comprising analysis means for analyzing the images of the reference image set and producing a coefficients scan sequence for ordering the coefficient in descending order.

12. A method of compressing an image, comprising the steps of:
    (a) producing transform coefficients for the image;
    (b) ordering the coefficients responsive to one of a color filter array used to capture the image and an image reference set representative of the image; and
    (c) encoding the ordered coefficients.

13. A method as recited in claim 12, wherein step (b) orders the coefficient in descending order.

14. A scan sequence for transforming a two dimensional block of transform coefficients, produced using a camera with a color filter array having a pattern, into a one dimensional list of the transform coefficients, comprising:
    scanning the block of coefficients in a descending order responsive to the color filter array pattern.

15. A scan sequence for transforming a two dimensional block of transform coefficients, produced using a single chip camera, into a one dimensional list of the transform coefficients, comprising:
    scanning the block of coefficients in a descending order responsive to analysis of typical images captured by the camera.

* * * * *